United States Patent
Ito et al.

(10) Patent No.: US 9,441,676 B2
(45) Date of Patent: Sep. 13, 2016

(54) BEARING ASSEMBLY INCLUDING IC TAG

(75) Inventors: Takashi Ito, Kuwana (JP); Naota Yamamoto, Kuwana (JP); Tsukasa Yamakawa, Kuwana (JP); Hirohide Komatsu, Yamato (JP); Tsutomu Sawa, Yamato (JP)

(73) Assignees: NTN CORPORATION, Osaka (JP); KRD CORPORATION, Kanagawa (JP)

( * ) Notice: Subject to any disclaimer, the term of this patent is extended or adjusted under 35 U.S.C. 154(b) by 212 days.

(21) Appl. No.: 14/130,010

(22) PCT Filed: Jun. 21, 2012

(86) PCT No.: PCT/JP2012/065860
§ 371 (c)(1),
(2), (4) Date: Jan. 29, 2014

(87) PCT Pub. No.: WO2013/005574
PCT Pub. Date: Jan. 10, 2013

(65) Prior Publication Data
US 2014/0140648 A1    May 22, 2014

(30) Foreign Application Priority Data
Jul. 1, 2011    (JP) .................................. 2011-146992

(51) Int. Cl.
*G08B 13/14*    (2006.01)
*F16C 41/00*    (2006.01)
(Continued)

(52) U.S. Cl.
CPC ........... *F16C 41/008* (2013.01); *F16C 19/364* (2013.01); *F16C 33/586* (2013.01);
(Continued)

(58) Field of Classification Search
CPC ...... F16C 41/008; F16C 19/36; F16C 19/06; F16C 19/26; F16C 33/38; F16C 33/4623; F16C 33/78; F16C 33/7853; B65C 2009/0003; G06K 19/077; G06K 19/07716; G06K 19/07745; G06K 19/07749; G08B 13/149
USPC ................. 340/572.8, 572.6, 572.1
See application file for complete search history.

(56) References Cited

U.S. PATENT DOCUMENTS 3,969,456 A * 7/1976 Graf ..................... H01F 41/0206
    419/66
5,898,388 A * 4/1999 Hofmann ............ F16C 33/7879
    310/168

(Continued)

FOREIGN PATENT DOCUMENTS

JP    2004-263724    9/2004
JP    2004-286087    10/2004
(Continued)

OTHER PUBLICATIONS

International Search Report issued Jul. 24, 2012 in International (PCT) Application No. PCT/JP2012/065860.
(Continued)

*Primary Examiner* — Emily C Terrell
(74) *Attorney, Agent, or Firm* — Wenderoth, Lind & Ponack, L.L.P.

(57) ABSTRACT

A bearing assembly includes an IC tag with information to be reliably exchanged between the IC tag and an external reader/writer, and a rolling bearing including outer and inner races and rolling elements disposed between the outer and inner races. The IC tag communicates with the external reader/writer device without contacting the reader/writer device, is attached to a metal member of the rolling bearing, includes a tag antenna, and is configured so information can be exchanged between the tag antenna and a reader/writer antenna of the reader/writer device by forming a closed magnetic circuit between the tag antenna and the reader/writer antenna. The IC tag is received in a hole in a metal member surface. The tag antenna includes at least two protrusions facing the opening of the hole and arranged so magnetic fluxes leaving/entering the protrusions pass inside the edge defining the hole opening and extend outside the hole.

8 Claims, 9 Drawing Sheets

(51) Int. Cl.
*G06K 19/07* (2006.01)
*G06K 19/077* (2006.01)
*H04B 5/00* (2006.01)
*F16C 33/58* (2006.01)
*F16C 19/36* (2006.01)
*F16C 43/04* (2006.01)

(52) U.S. Cl.
CPC ..... *G06K19/0723* (2013.01); *G06K 19/07771* (2013.01); *H04B 5/0056* (2013.01); *F16C 43/04* (2013.01); *F16C 2233/00* (2013.01)

(56) References Cited

U.S. PATENT DOCUMENTS

| | | | | |
|---|---|---|---|---|
| 6,181,129 | B1* | 1/2001 | Message | B62D 15/02 324/207.22 |
| 2002/0054719 | A1* | 5/2002 | Takizawa | F16C 19/525 384/448 |
| 2002/0141673 | A1* | 10/2002 | Ito | G01P 1/026 384/448 |
| 2002/0186134 | A1* | 12/2002 | Rehfus | F16C 41/008 340/572.8 |
| 2003/0059138 | A1* | 3/2003 | Nantua | F16C 33/78 384/448 |
| 2005/0040814 | A1* | 2/2005 | Vig | G01D 5/145 324/179 |
| 2006/0039639 | A1* | 2/2006 | Aoki | F16C 33/586 384/448 |
| 2006/0170551 | A1 | 8/2006 | Nakamura et al. | |
| 2006/0274983 | A1 | 12/2006 | Takahashi et al. | |
| 2007/0159352 | A1* | 7/2007 | Sahashi | F16C 19/184 340/870.07 |
| 2009/0256560 | A1 | 10/2009 | Arimura | |

FOREIGN PATENT DOCUMENTS

| | | |
|---|---|---|
| JP | 2006-038189 | 2/2006 |
| JP | 2006-044740 | 2/2006 |
| JP | 2006-046558 | 2/2006 |
| JP | 2006-053603 | 2/2006 |
| JP | 2007-081028 | 3/2007 |
| JP | 2007-285417 | 11/2007 |

OTHER PUBLICATIONS

Written Opinion of the International Searching Authority issued Jul. 24, 2012 in International (PCT) Application No. PCT/JP2012/065860 (with English translation).

* cited by examiner

BEARING ASSEMBLY INCLUDING IC TAG

TECHNICAL FIELD

This invention relates to a bearing assembly including an IC tag capable of communicating with an external device without contacting the external device.

BACKGROUND ART

IC tags utilize radio frequency identification (RFID) technology, and can exchange information with external devices without contacting them. Today's IC tags are increasingly smaller in size and lower in cost, and are being already widely used mainly in the field of physical distribution.

IC tags are beginning to find their applications particularly in the machinery-related field too. For example, the below-identified Patent documents 1 and 2 disclose IC tags attached to component parts of rolling bearings in e.g. wheel bearing assemblies. In each of such IC tags, it is possible to store various kinds of identification information regarding the component part to which the IC tag is attached, such as the type of the component part, the date of manufacture, its production lot, and production history.

By reading the information stored in the IC tag when necessary, such as during storage, during distribution, before use, during use, or after use, of the corresponding component part, anyone can instantly access the identification information regarding this component part. This makes it possible to do away with the old way in which the identification information of a particular component part is searched in a computer or in a book listing machine parts during maintenance or if the component part fails.

But there is one problem in using IC tags in the machinery-related field. That is, many parts used in the machinery-related field are made of metal. If an IC tag is attached to a metal member, its sensitivity tends to significantly decreases due to the influence of the metal member on magnetic fluxes generated by an antenna of the IC tag. If the sensitivity of the IC tag decreases significantly, it becomes difficult for the IC tag to properly communicate with an external reader/writer device, or the communication range significantly decreases.

It is known that if magnetic fluxes generated from the antenna of an IC tag pass through a material having a high conductivity (such as a metal) or a material having a high magnetic permeability (such as iron, nickel, cobalt, their compounds, sendust, carbonyl iron or ferrite (magnetic materials)), sensitivity of the IC tag tends to decrease. Members made of any of these materials are hereinafter referred to as a "metal member".

Thus, when it is necessary to attach an IC tag to a machine part in the form of a metal member, the IC tag is stuck on the metal member such that the entire antenna protrudes from the surface of the metal member, or the IC tag is embedded in a resin member attached to the metal member, such as a seal member or a sensor case (see e.g. Patent documents 1 and 2).

Figure 9:
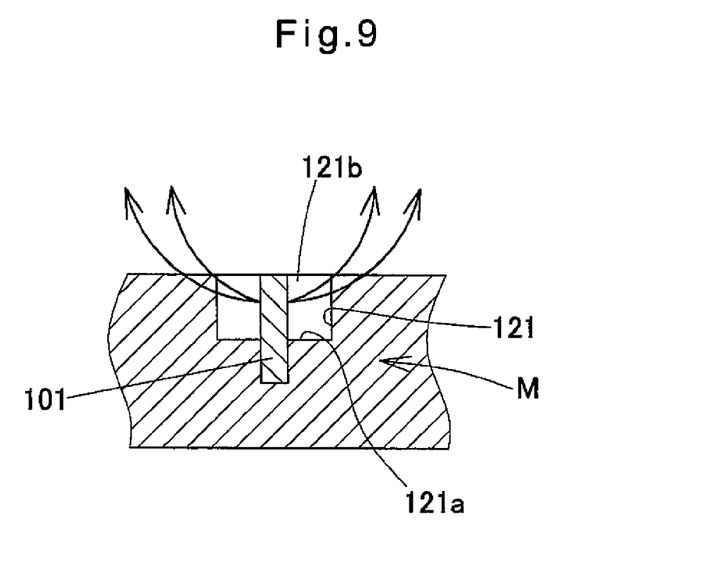
FIG. 9 is a sectional view of a conventional example.

It is also known, as shown in FIG. 9, to form a countersink 121 in a metal member M so as to embed and fix an IC tag 101 in the metal member M. The diameter of the countersink 121 increases gradually from its bottom 121a toward its opening 121b at the surface of the metal member M.

With this arrangement, as shown by the arrows in FIG. 9, portions of magnetic fluxes generated from the antenna of the IC tag 101 that pass through the metal member M are relative short, so that the magnetic fluxes can readily reach the antenna of an external reader/writer device (not shown) (see e.g. the below-identified Patent document 3).

PRIOR ART DOCUMENTS

Patent Documents

Patent document 1: JP Patent Publication 2006-38189A
Patent document 2: JP Patent Publication 2006-46558A
Patent document 3: JP Patent Publication 2006-53603A In the fixing arrangement of the IC tag 101 shown in FIG. 9, the countersink 121 defines a space around the IC tag 101. The space serves to maintain sensitivity between the IC tag 101 and the reader/writer device to some extent.

But in this arrangement too, it is impossible to completely prevent the magnetic fluxes generated from the antenna of the IC tag 101 from passing through the metal member M. This is because magnetic fluxes leave the antenna in directions substantially parallel to the surface of the metal member (right and left directions in FIG. 9), and then are curved (upwardly in FIG. 9) toward an external reader/writer device. Since magnetic fluxes pass through the metal member M, sensitivity between the IC tag 101 and the reader/writer device inevitably decreases.

One way to reduce interference of the metal member M with magnetic fluxes is to further increase the diameter of the countersink 121. But the larger the diameter the countersink 121, the less stably the IC tag 20 can be fixed in position. Also, since a larger space forms around the IC tag 101, the IC tag 101 becomes more likely to be damaged.

Figure 10:
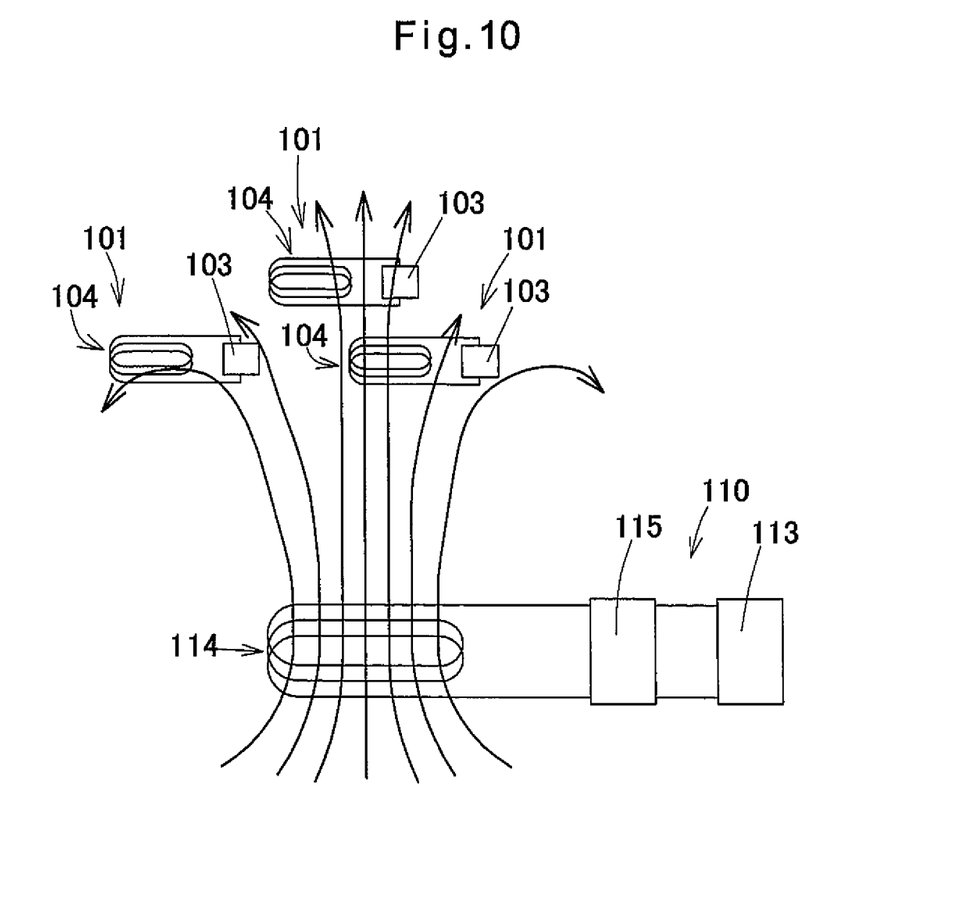
FIG. 10 shows the state in which conventional IC tag and reader/writer device are located close to each other.

How the metal member M interferes with magnetic fluxes is described in detail with reference to FIG. 10, which shows a typical conventional RFID system.

The RFID system shown in FIG. 10 includes a reader/writer device 110 having an antenna 114 (this antenna is hereinafter referred to as the "reader/writer antenna") connected to the reader/writer. In order that the reader/writer device 110 can simultaneously read information stored in a large number of IC tags (RFID tags) 101 which are spaced long distances from the reader/writer device 110 and from each other, the reader/writer antenna 114 is relative large in size. Magnetic fluxes of 13.56 MHz are discharged into a large free space to read information from the IC tags.

Magnetic fluxes from the reader/writer antenna 114 are received by the antenna 104 (tag antenna) of any IC tag 101 located within the reach of the magnetic fluxes. When magnetic fluxes are received by any IC tag 101, the magnetic fluxes are used as electric power for driving the IC chip 103 of the IC tag 101. The IC chip 103 thus performs necessary operations and returns result data to the reader/writer device by modulating the magnetic fluxes received.

In order for this system to effectively function, the reader/writer device 110 includes a circuit 113 which synchronizes the antenna circuit of the reader/writer device 110 and the antenna circuits of the IC tag 101 to the operating frequency, i.e. 13.56 MHz, while simultaneously matching them.

There are several causes which could reduce performance of IC tags if metal members (such as conductive members or magnetic members) are present near this system.

First, a short-circuit could form between a metal member located near the system and both of the reader/writer antenna 114 and the tag antenna 104 such that the short-circuit reduces magnetic fluxes generated form the reader/writer antenna 114, thus reducing energy transferred to the IC tags 101, which in turn reduces sensitivity of the IC tags.

That is, when magnetic flux loops generated from the reader/writer antenna 114 cross metal members M, eddy current is generated, and the eddy current is consumed as heat in the short-circuit. This reduces energy transmitted to the RFID tags. Also, due to reduced energy, the distances by which the response from the respective RFID tags toward the reader/writer antenna 114 tend to be short, which could make communication totally impossible.

One effective way to prevent this from happening is to reduce the number of magnetic fluxes that pass through the short-circuit. This number can be reduced by e.g. placing a magnetic shielding sheet between an IC tag 101 and the metal member M.

Secondly, a metal member (conductive member) that is located close to a resonant circuit could shift the resonant frequency.

According to the principle of electromagnetics, when magnetic fluxes pass through a conductive member, the inductance of a coil forming an LC resonant circuit substantially decreases, thus increasing the resonant frequency. Conversely, a magnetic member located close to the resonant circuit increase magnetic fluxes that pass the coil in proportion to the magnetic permeability, thus substantially increasing the inductance and reducing the resonant frequency.

Generally speaking, since the quality factor Q at the resonant frequency is set at a suitably large value in order to increase the communication range of an IC tag 101, transmission efficiency is high while frequencies coincide. But if frequencies shift, the transmission efficiency tends to deteriorate sharply, thus reducing sensitivity of the IC tag 101.

One effective way to prevent this is to adjust the resonant frequency of the resonant circuit to correct changes in the resonant frequency beforehand. Another way is to place a magnetic shielding sheet between the metal member and the resonant circuit to reduce the influence of the metal member. By placing a magnetic shielding sheet, which is effective in avoiding the above first problem, between the metal member and the resonant circuit, it is possible to adjust the circuit such that the inductance increases. Thus, it is necessary to take every influence into consideration in adjusting the resonant frequency.

But any of these conventional measures cannot completely eliminate the influence of metal members, so that if an IC tag has to be attached to a metal member, its sensitivity inevitably deteriorates. Any of these measures cannot create an RFID system which operates reliable, because for example, one measure requires an extremely small antenna, and another measure makes it impossible to provide a sufficient space between the metal member or magnetic member and the IC tag.

SUMMARY OF THE INVENTION

An object of the present invention is to a bearing assembly which includes a rolling bearing and an IC tag of the non-contact communication type attached to a metal member of the rolling bearing, and which is configured such that information can be reliably exchanged between the IC tag and an external reader/writer.

Means for Achieving the Object

In order to achieve this object, the present invention provides a bearing assembly comprising a rolling bearing including an outer race, an inner race and rolling elements disposed between the outer race and the inner race, and an IC tag capable of communicating with an external reader/writer device without contacting the reader/writer device, and attached to a metal member of the rolling bearing, wherein the IC tag includes a tag antenna and is configured such that information can be exchanged between the tag antenna and a reader/writer antenna of the reader/writer device by forming a closed magnetic circuit between the tag antenna and the reader/writer antenna, wherein the IC tag is received in a hole formed in a surface of the metal member, wherein the tag antenna includes a plurality of protrusions facing an opening of the hole, wherein the protrusions are arranged such that magnetic fluxes leaving and/or entering the protrusions pass inside of an edge defining the hole and extend to outside of the hole, whereby information can be exchanged between the IC tag and the reader/writer device.

In this arrangement, information is exchanged between the IC tag of the bearing assembly and an (external) reader/writer device which is a separate member from the bearing assembly.

The reader/writer device includes a reader/writer antenna capable of receiving information from the tag antenna of the IC tag and transmitting information to the tag antenna. The protrusions are arranged such that magnetic fluxes leaving the protrusions pass inside the edge defining the opening of the hole and extend to outside of the hole, thus forming a closed magnetic circuit between the tag antenna and the reader/writer antenna. The reader/writer device and the reader/writer antenna are not particularly limited, provided information can be exchanged with the IC tag through the closed magnetic circuit.

For example, the reader/writer antenna may include, as with the tag antenna, at least a plurality of protrusions which oppose the respective protrusions of the tag antenna.

With this arrangement, magnetic fluxes through which information is exchanged do not pass through the metal member.

If the magnetic fluxes between the reader/writer antenna of the reader/writer device and the tag antenna of the IC tag are trapped between these antennas so that magnetic fluxes never leak from between the antennas, it is possible to eliminate the influence of the surrounding metal member on the closed magnetic circuit.

In one arrangement, the plurality of protrusions are portions of a core made of a material having a high magnetic permeability and including a base portion through which the protrusions are coupled together, the tag antenna further comprises a wire made of a conductive material and wound around one of the base portion and the protrusions, and the IC tag further comprises an IC chip connected to the two ends of the wire. The core may be one of a plurality of parts of a toroidal core obtained by circumferentially breaking the toroidal core.

In another arrangement, the plurality of protrusions are portions of a core made of a material having a high magnetic permeability and including a base portion through which the protrusions are coupled together, a first one of the protrusions is surrounded by the other or others of the protrusions, the tag antenna further comprises a wire made of a conductive material and wound around the first one of the protrusions, and the IC tag further comprises an IC chip connected to the two ends of the wire.

These arrangements are described in detail. Transformers and coils are well-known means that can efficiently transmit electric power or signals. In such transformers and coils, in order to efficiently guide magnetic fluxes generated from the primary coil to the secondary coil, a silicon steel plate of a ferrite core, which is higher in magnetic permeability than air, and thus through which magnetic fluxes are easily passable, is used to trap magnetic fluxes, thereby efficiently transmitting power and signals.

According to the present invention, two coils similar to those used in the above known structure are used for the reader/writer antenna and the tag antenna, respectively. The two coils (which are conductor wires) are wound around respective cores made of a material having a high magnetic permeability and forming a closed magnetic circuit, thereby forming a tag system.

Since the core of the reader/writer antenna is made of a material having a high magnetic permeability such as a ferromagnetic material, magnetic fluxes generated from the reader/writer antenna have a higher density and thus a higher coupling factor than those generated from ordinary antennas used in the air. Such magnetic fluxes are mostly trapped within the magnetic core, which is higher in magnetic permeability than air, so that less magnetic fluxes leaks to outside.

This prevents deterioration in the performance of the IC tag due to leakage of magnetic fluxes, even if there exists a metal member (such as the above-mentioned conductor materials or magnetic members) near the IC tag.

The same is true with the tag antenna. In an arrangement in which the reader/writer antenna (in particular, its core, around which the conductor wire is wound) is positioned to face the tag antenna (in particular, its core, around which the conductor wire is wound), the system operates in a satisfactory manner not only if the cores are in contact with each other, but also if there is a gap therebetween, though in the latter case, the coupling factor decreases and the resonant frequency shifts.

If coils are wound around a pair of respective cores made of a material high in magnetic permeability, the core inductance increases. Such core inductance is the highest if the cores of the RFID tag and the antenna are in close contact with each other, and gradually decreases with an increase in the gap therebetween. Its coefficient is called the inductance factor (AL).

Since the core inductance changes with the gap between the cores, the number of turns of each coil is preferably adjusted such that an optimum inductance is obtained at a position where the communication distance is maximum.

Even at this position, magnetic fluxes generated from the end surface of one of the cores is absorbed into the end surfaces of the other core, which is made of a material having a magnetic permeability higher than air, (in particular, the end surfaces of the protrusions), so that leakage of magnetic fluxes is sufficiently small. The RFID system is therefore less likely to be influenced by any surrounding magnetic member.

Now description is made of how the size of the tag is reduced. In the case of a passive RFID tag, which has no built-in power source such as a battery, the IC chip of the tag is driven by electric power induced in the coil of the RFID tag due to electromagnetic induction from the magnetic field radiated from the antenna of the reader.

Voltage generated is determined by the number of turns of the coil and the sectional area S of the coil, if the magnetic flux density is determined.

Since the minimum terminal voltage necessary for operation is determined based on the characteristics of the IC chip used, if the size of the tag is reduced to a certain point, and the coil sectional area S is correspondingly reduced, the voltage generated drops below the above minimum value.

The voltage generated at both ends of the coil is given by the following [Equation 1]

$$V = -nS\frac{dB}{dt} \qquad \text{[Equation 1]}$$

where
V is the voltage generated;
n is the number of turns of the coil;
S is the sectional area of the coil; and
B is the magnetic flux density.

Thus, the minimum coil diameter necessary for operation is determined based on the magnetic flux density in the field where there is the coil, which means that the coil can be reduced in size by increasing the magnetic flux density.

According to the present invention, a closed magnetic circuit is formed by the tag antenna and the reader antenna, which are both made of a material having a high magnetic permeability, so that a voltage necessary for operation of the IC chip of the tag antenna is obtainable, even though the reader antenna is small and the electric power applied to the reader antenna is small.

Similarly, even though the antenna is small in size, a response signal from the tag can be efficiently transmitted.

For the above reasons, the present invention realizes a small RFID tag which was impossible with conventional arrangements.

The cores may be formed by sintering or molding powder of a magnetic material. If the cores are formed from a toroidal core member, magnetic material powder is formed into an annular (ring) shape by sintering or molding, and this annular member is broken into a plurality of pieces as C-shaped cores each including two protrusions coupled together by a base portion. If a core member having the shape of a Japanese character "ロ" is used instead of a toroidal core member, by braking this member into a plurality of pieces as cores having the shape of a Japanese character "コ" and each including two protrusions coupled together by a base.

The cores each including a plurality of protrusions which are coupled together by a base may be formed by a method other than breaking a single member, such as by sintering or molding magnetic material powder into C-shaped or "コ"-shaped (in side view) cores each including two protrusions coupled together by a base, or into E-shaped (in side view) cores each including three protrusions coupled together by a base. Alternatively, the cores may be pot-shaped cores each including a plurality of protrusions coupled together by a base, with one of the protrusions surrounded by the other protrusion or protrusions, which are circular arc-shaped, annular or otherwise shaped.

The above magnetic material powder may be e.g. ferrite, carbonyl iron, iron, nickel, cobalt, or their compounds, and is preferably sintered or molded. The cores may be formed of different materials having a high magnetic permeability other than sintered materials, such as a silicon steel plate, a Permalloy material, or a super-Permalloy material. If there is no problem of eddy current loss, the cores may be formed from a solid material instead of a laminated material.

The cores have preferably a magnetic permeability of 1 to 2000, practically 2 to 100.

The core and the coil of the reader/writer antenna may be of the same structure and made of the same materials as those of the tag antenna. But the former may be different in structure and material from the latter for optimization of the system.

It was confirmed that the RFID system operated reliably when the distance between the IC tag antenna and the reader/writer antenna is set at 0 to 5 mm, and each core was shaped such that it was 2 to 6 mm wide and 1 to 4 mm in wall thickness.

In any of these arrangements, the IC tag may further comprise a casing in which the antenna of the IC tag and its IC chip are received. The casing may be a tubular one with the protrusions having end surfaces facing one of the two openings of the casing at the respective two axial ends of the casing.

In another arrangement, the IC tag further comprises a casing formed with a recess in which the tag antenna and the IC chip are received, with the protrusions having end surfaces facing the opening of the recess.

With these arrangements, since the antenna and the IC chip, of the IC tag are received in the casing, any external force that acts on the metal member is less likely to act on the tag antenna or IC chip. The casing also prevents the tag antenna and IC chip from being hit and damaged by foreign matter.

The casing may be made of a metal or a resin. But if the portion of the casing which the protrusions of the tag antenna face is closed, at least the closed portion of the casing is preferably made of a material that does not lower sensitivity, such as resin.

The IC tag may further comprise a packing placed in the space defined between the tag antenna and the IC chip and the inner wall of the casing. The packing serves to more rigidly fix the tag antenna and the IC chip to the casing, thus increasing the durability of the IC tag. The packing also serves to more reliably prevent entry of foreign matter into the casing. The packing may be made of a resin or rubber.

The IC tag may be fixed in position in the hole by means of an adhesive. If the casing is used, the casing may be fixed in position in the hole by means of an adhesive. In the latter arrangement, the casing may be directly fixed to the inner wall of the hole by an adhesive, or may be indirectly fixed to the inner wall of the hole through a packing which is integral with the casing in a solidified state and fixed to the inner wall of the hole by an adhesive.

The adhesive may be disposed in an adhesive holding recess formed in the bottom of the hole. With this arrangement, the bond strength between the IC tag or the casing may be fixed to the inner wall of the hole.

The casing may be fixed in position in the hole by bringing an external thread formed on the outer periphery of the casing into threaded engagement with the hole.

By bringing the casing into threaded engagement with the hole of the metal member, the depth of the casing in the hole is adjustable, so that it is possible to adjust the position of the antenna of the IC tag (in the direction of the depth of the hole) relative to the surface of the metal surface, which in turn makes it possible to easily adjust sensitivity of the tag.

The casing is preferably completely received in the hole of the metal member so as to more reliably prevent the casing from e.g. being hit and damaged by foreign matter.

The casing may have a head larger in diameter than the portion of the casing formed with the external thread (hereinafter referred to as the "threaded portion"). In this case, the casing is threaded in the hole with the threaded portion located close to the bottom of the hole and the head located at the opening of the hole. In this arrangement, the hole formed in the metal member is preferably a countersink.

The head of the casing may be formed with a recess in which the antenna and the IC chip, of the IC tag can be received. Alternatively, a hole may be formed in the casing to extend through its head and threaded portion in the direction in which the casing is threaded into the hole such that the antenna and the IC chip, of the IC tag can be received in the hole formed in the casing.

Further alternatively, the casing may be in the form of a columnar or cylindrical setscrew, i.e. a member having no head. With this arrangement, the antenna and the IC chip, of the IC tag may be received in a recess formed in the end surface of the casing facing the surface of the metal member. Otherwise, the antenna and the IC chip, of the IC tag may be received in a hole formed in the casing to extend therethrough over the entire length in the direction in which the casing is threaded into the hole of the metal member.

In the arrangement in which the external thread is formed on the casing, an adhesive may be disposed between the external thread and the inner wall of the hole. With this arrangement, the adhesive serves to prevent loosening of the threaded engagement.

Advantages of the Invention

The system according to the present invention is configured such that magnetic fluxes through which information is transmitted and received do not pass through a metal member. In particular, according to the present invention, it is possible to trap magnetic fluxes which couple the reader/writer antenna of the reader/writer device to the tag antenna of the IC tag between these antennas so as not to leak to outside. This prevents the closed magnetic circuit from being influenced by any adjacent metal member, which in turn makes it possible to reliably exchange information between the IC tag of the metal member of the rolling bearing and the external reader/writer device.

In particular, magnetic fluxes leaving any of the protrusions of the tag antenna of the IC tag are mostly absorbed by the corresponding one of the protrusions of the reader/writer antenna of the reader/writer device, while magnetic fluxes leaving any of the protrusions of the reader/writer antenna is mostly absorbed by the opposed one of the protrusions of the tag antenna. Thus, even if the IC tag is embedded in a metal member, information can be reliably exchanged between the IC tag and the reader/writer device without being influenced by the metal member.

By selecting a material which is high in heat resistance, chemical resistance and water resistance as the material for the antenna module of the reader/writer device and the IC tag module comprising the tag antenna, IC chip, etc., it is possible to improve the durability of the RFID system.

BRIEF DESCRIPTION OF THE DRAWINGS

FIGS. 2(a) and 2(b) show how an IC tag and a reader/writer device operate, of which

FIGS. 3(a) and 3(b) are views similar to FIGS. 2(a) and 2(b) and show a different IC tag, of which

FIGS. 4(a) and 4(b) are views similar to FIGS. 2(a) and 2(b) and show a still different IC tag, of which

FIGS. 5(a) to 5(c) show another embodiment of the present invention, of which

BEST MODE FOR EMBODYING THE INVENTION

Figure 1:
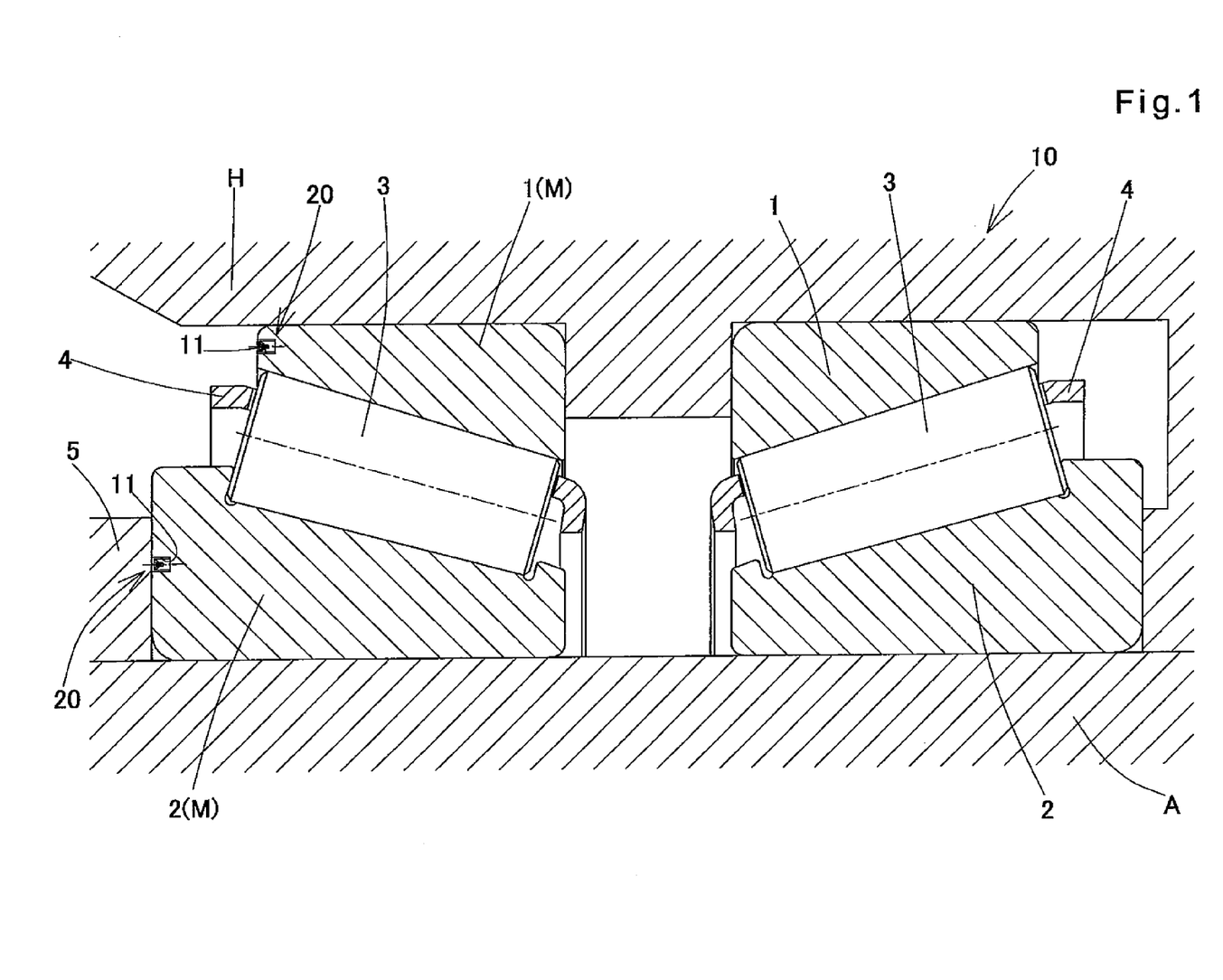
FIG. 1 is a partial enlarged sectional view of a bearing assembly including IC tags of an embodiment of the present invention.

The embodiment of the invention is described with reference to the drawings. FIG. 1 shows this embodiment, which is a bearing assembly including two rolling bearings each including an outer race 1, an inner race 2, and rolling elements 3 disposed between the inner and outer races. IC tags 20 capable of communication in a non-contact manner are attached to respective metal members M of one of the rolling bearings 10 (first rolling bearing 10).

In the embodiment, the rolling bearings are tapered roller bearings. But they may be a different kind of rolling bearings such as cylindrical roller bearings or ball bearings.

Figure 2:
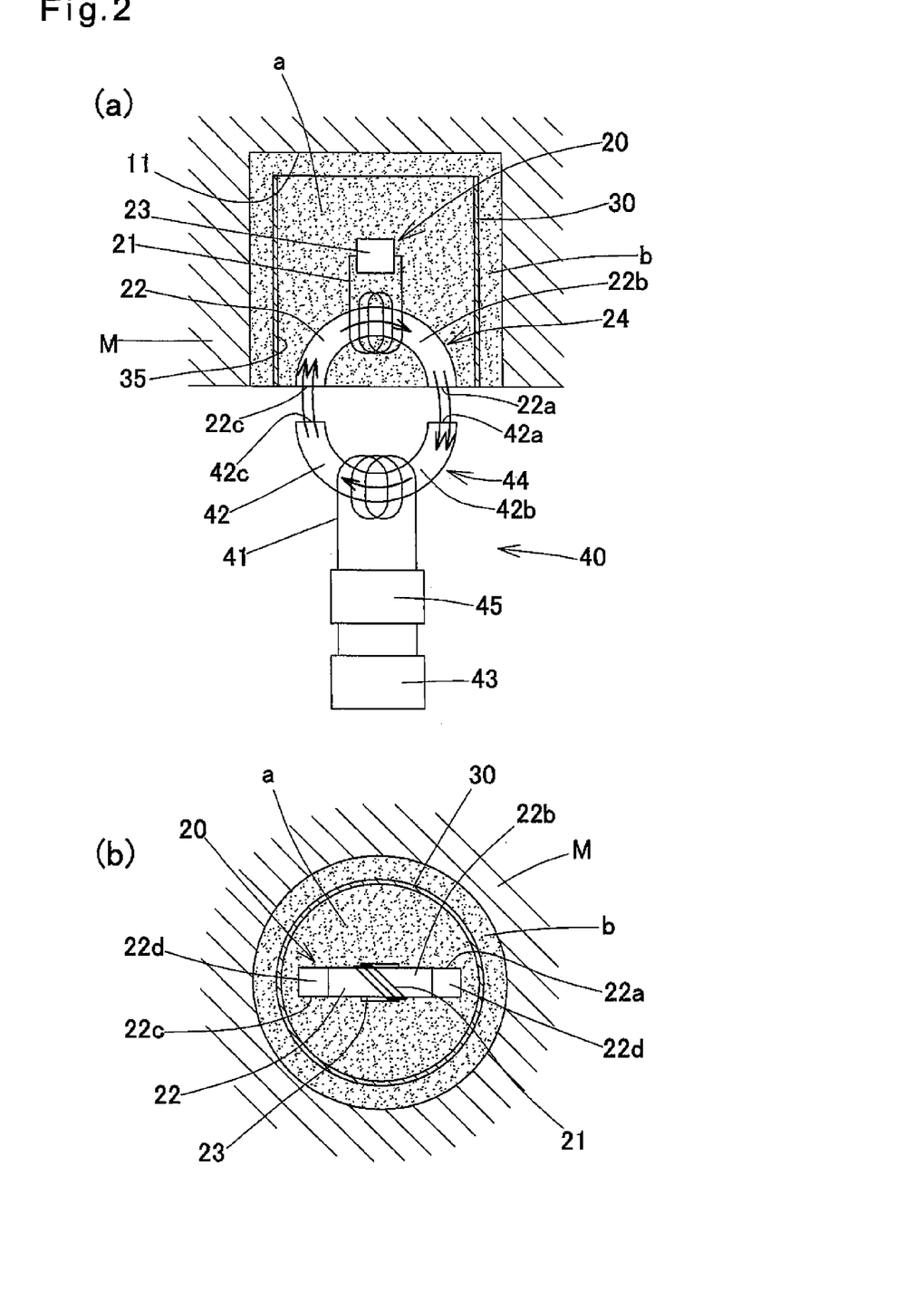
FIG. 2(a) is a partial sectional view showing the state in which the IC tag and the reader/writer device are located close to each other.
FIG. 2(b) is a bottom plan view of a metallic member in which the IC tag is embedded.
Figure 3:
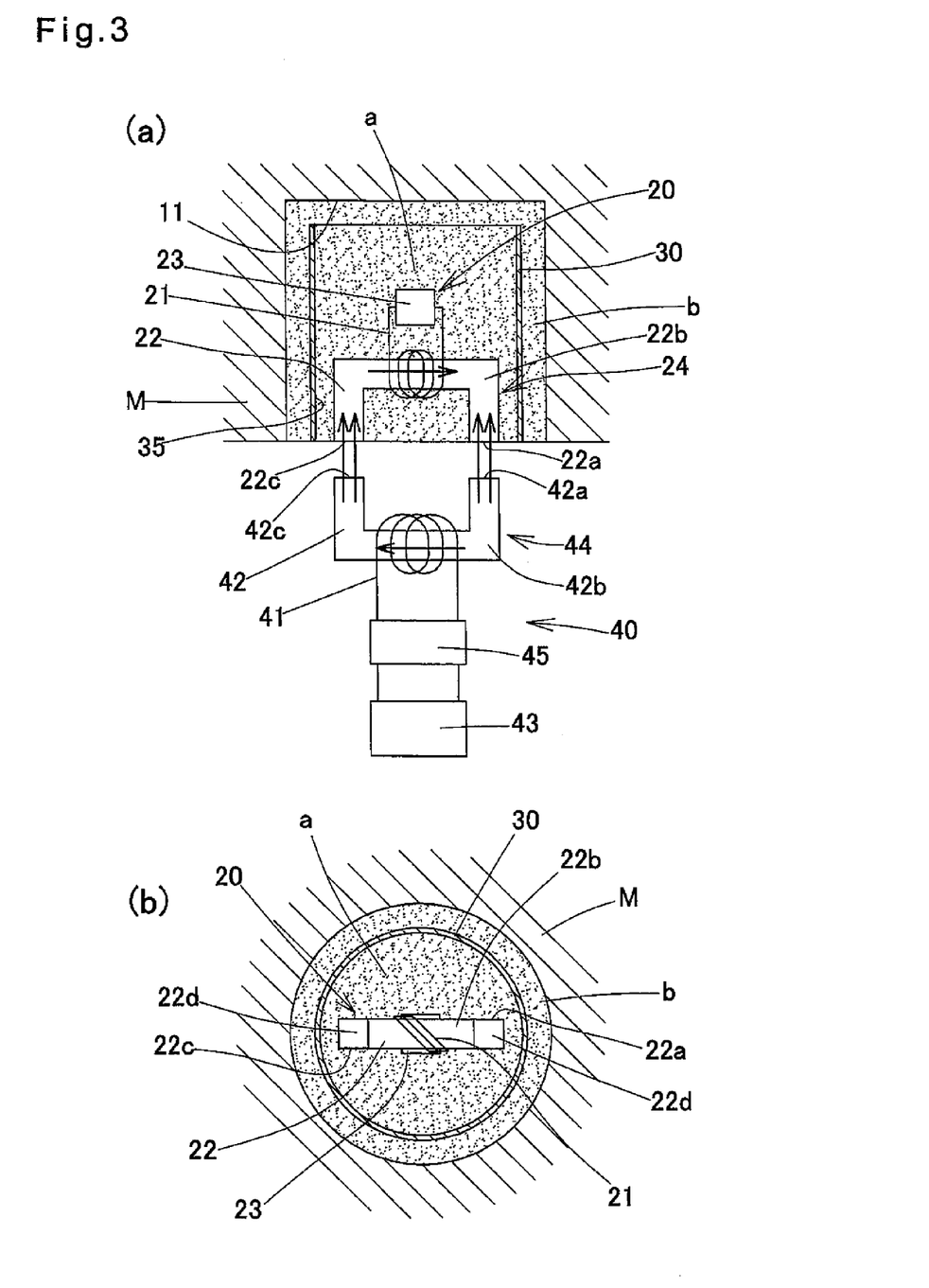
FIG. 3(a) is a partial sectional view showing the state in which the IC tag and the reader/writer device are located close to each other.
FIG. 3(b) is a bottom plan view of a metallic member in which the IC tag is embedded.
Figure 4:
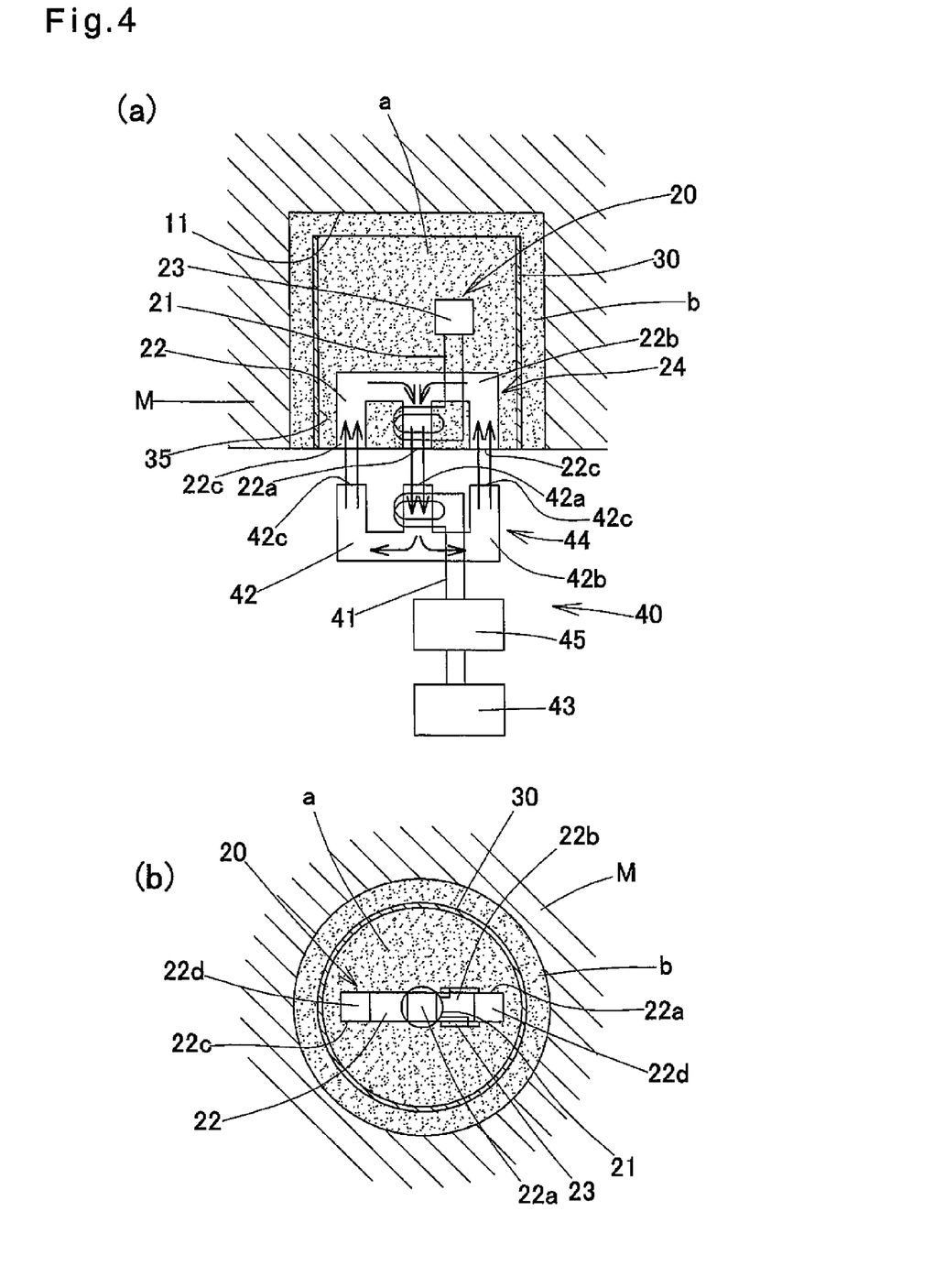
FIG. 4(a) is a partial sectional view showing the state in which the IC tag and the reader/writer device are located close to each other.
FIG. 4(b) is a bottom plan view of a metallic member in which the IC tag is embedded.

An external reader/writer device 40 is used to exchange information with the IC tags of the bearing assembly (FIGS. 2 to 4).

As shown in FIG. 1, the IC tags 20 are received in holes 11 open to axial end surfaces of the outer race 1 and the inner race, respectively, which are both metal members M. But the IC tags 20 may be attached to metal members M other than the outer race 1 and the inner race 2.

In the embodiment, a presser member 5 provided on the left-hand side of the inner race 2 of the first rolling bearing 10 in FIG. 1 presses the inner race 2 rightwardly in FIG. 1, thus applying a preload to the bearing. Thus, in order to read information stored in the IC tag 20 attached to the inner race 2, it is necessary to expose this IC tag 20 by e.g. removing the presser member 5 before moving the reader/writer device 40 close to the IC tag 20.

In order to read information stored in the IC tag 20 attached to the outer race 1 too, it is necessary to disassemble the rolling bearing 10 and the surrounding members to such an extent that the reader/writer device 40 can be moved sufficiently close to this IC tag 20.

Needless to say, if the reader/writer device 40 can be moved sufficiently close to the IC tag 20 without disassembling the bearing and the surrounding members, it is not necessary to disassemble these members.

The IC tags 20 are now described. Each IC tag 20 includes a tag antenna 24 comprising a core 22 made of a material having a high magnetic permeability, and a conductor wire 21 wound around the core 22. Materials having a high magnetic permeability include ferromagnetic materials such as iron, nickel, cobalt, their compounds, sendust, carbonyl iron and ferrite.

As shown in FIG. 2, the core 22 includes two circular arc-shaped protrusions 22a and 22c extending in the same direction and coupled together through a circular arc-shaped base portion 22b. The core 22 thus has the shape of the letter C as a whole, as viewed from one side of the IC tag. Thus, the protrusions 22a and 22c of the tag antenna 24 define the respective ends of the C-shaped core 22.

In this embodiment, the core 22 is one of two parts of an annular toroidal core obtained by circumferentially breaking the toroidal core. The toroidal core is formed by sintering a magnetic powder material into an annular shape. The magnetic power material may e.g. be carbonyl iron or ferrite. Instead of breaking a toroidal core, the core may be formed by sintering a magnetic powder material into the above-mentioned C-shape.

In this embodiment, the protrusions 22a and 22c each have a flat end surface 22d. This is because the flat end surfaces 22d stabilize the magnetic flux.

The flat end surfaces are preferably arranged in a common plane. But they may not be in a common plane. In particular, provided the tag maintains sufficient sensitivity, the positional relationship between the flat surfaces is not limited. (For example, the flat surfaces may be displaced from each other in the direction in which the protrusions 22a and 22c extend or in the direction of the line connecting the protrusions 22a and 22c together.) Also, provided the tag maintains sufficient sensitivity, the orientations of the flat surface are not limited either.

An IC chip 23 is connected to both ends of the wire 21 wound around the core 22. The IC chip 23 is driven by a magnetic field received by the tag antenna 24 from a reader/writer antenna 44 (which is described later) to perform necessary processing and return the result of processing by modifying the magnetic field received.

As shown in FIG. 2, the protrusions 22a and 22c of the tag antenna 24 are located in the hole 11 of the metal member M such that their end faces face the opening of the hole 11.

Next, the reader/writer device 40 is described. The reader/writer antenna 44 of the reader/writer device 40 is similar to the tag antenna 24, and includes a core 42 made of a material having a high magnetic permeability, and a conductor wire 41 wound around the core 42. The material of the core 42 may be the same as that of the core 22 of the tag antenna 24.

The core 42 of the reader/writer antenna 44 is identical in shape to the core 22 of the tag antenna 24. Thus, as shown in FIG. 2, the core 42 includes two circular arc-shaped protrusions 42a and 42c extending in the same direction and coupled together through a circular arc-shaped base portion 42b. The core 42 thus has the shape of the letter C as a whole, as viewed from one side of the IC tag. Thus, the protrusions 42a and 42c of the reader/writer antenna 44 define the respective ends of the C-shaped core 42. The core 42 is one of the two parts of an annular toroidal core obtained by circumferentially breaking the toroidal core.

The wire 41, which is wound around the core 42, has its both ends connected to a matching circuit 45 of a reader/writer 43 of the reader/writer device 40.

Since the antenna terminals of ordinary reader/writers have an impedance of 50Ω, the inductance of the antenna coil is adjusted to 50Ω, by the matching circuit so that the output of the reader/writer can be efficiently transmitted to the antenna, and so that the signal from the tag can be entered into the reader/writer without attenuation.

In order to exchange information between the IC tag 20 and the reader/writer device 40, with the reader/writer device 40 powered on so that the device 40 can transmit and receive signals, the reader/writer antenna 44 is moved until, as shown in FIG. 2, its protrusions 42a and 42c are aligned with the respective protrusions 22a and 22c of the tag antenna 24.

In this state, as shown by the arrows in FIG. 2, magnetic fluxes leaving (and entering) the respective protrusions 22a and 22c of the tag antenna 24 mostly pass through the opening of the hole 11 of the metal member M, i.e. pass the inside of the edge of the opening of the hole 11, to outside the hole 11. Thus, the IC tag 20 and the reader/writer device 40 can form a closed magnetic circuit with high sensitivity sufficient to allow exchange of information between the IC tag 20 and the reader/writer device 40.

Since the cores 22 and 42 are formed by breaking an annular toroidal core having a high magnetic permeability, by winding the conductor wire around each core into a coil, magnetic fluxes generated from the conductor wire coil mostly stay in the core, and scarcely leave the core. Thus, even though the IC tag 20 is embedded in the metal member M, the metal member M scarcely influences the magnetic fluxes. With the tag antenna 24 and the reader/writer antenna 44, which are identical in structure, facing each other, the antennas 24 and 44 form an annular body identical in shape to the toroidal core. Thus, information can be reliably exchanged therebetween.

For example, magnetic fluxes leaving the protrusion 22a of the tag antenna 24 of the IC tag 20 are mostly absorbed by the protrusion 42a of the reader/writer antenna 44 of the reader/writer device 40, which faces the protrusion 22a, while magnetic fluxes leaving the protrusion 42c of the reader/writer antenna 44 are mostly absorbed by the protrusion 22c of the tag antenna 24, which faces the protrusion 42c. Thus, even though the IC tag 20 is embedded in the metal member M, the metal member M scarcely influences the magnetic fluxes, so that information can be reliably exchanged between the IC tag and the reader/writer device 40.

Another advantage of the closed magnetic loop technology used in this RFID tag system is that magnetic fluxes radiating from the antenna are effectively trapped in the core, so that the electromagnetic energy radiated into free space from the antenna decreases. This minimizes the influence of the system according to the present invention on other electronic devices.

In this embodiment, the tag antenna 24 and the IC chip 23, both of the IC tag 20 are received in a tubular casing 30 such that the end surfaces 22d of the protrusions 22a and 22c faces one of openings of the casing 30 at the axial ends of the casing 30.

Since the tag antenna 24 and the IC chip 23, of the IC tag are received in the casing 30, even if external force acts on the metal member M, the casing 30 reduces the force that is applied to the tag antenna 24 and the IC chip 23. The casing 30 also prevent damage to the tag antenna 24 and the IC chip 23 by being hit by foreign matter.

In this embodiment, a packing a is placed in the space between the tag antenna 24 and the IC chip 23 and the inner wall 35 of the casing 30.

The packing a keeps the tag antenna 24 and the IC chip 20 stably fixed in position relative to the casing 30, thus increasing the durability of the IC tag 20. The packing a also more reliably prevents entry of foreign matter into the casing 30. The packing a may be made of e.g. resin or rubber. The packing a may be an adhesive too.

The casing 30, in which the IC tag 20 is received, may be fixed in position in the hole 11 of the metal member M by directly fitting the casing 30 in the hole 11. But in order to more stably fix the casing 30 in position, as shown in FIG. 2, a packing b is preferably placed between the casing 30 and the inner wall of the hole 11 of the metal member M. The packing b may be made of resin or rubber, but is more preferably an adhesive. Due to its elasticity, the packing b prevents vibration of the IC tag 20 and deformation of the casing 30.

If the casing 30 is not used, the IC tag 20 may be fixed in position in the hole 11 of the metal member M by directly fitting the IC tag in the hole 11. But in order to more reliably fix the IC tag 20 in position, the packing b is preferably used in this case too.

FIG. 3 shows a modification of the IC tag 20 of the above embodiment, in which instead of the C-shaped cores 22 and 42, cores 22 and 42 having a shape similar to a Japanese character "コ" as viewed from one side of the IC tag are used.

As shown in FIG. 3, the cores 22 and 42 of this modified example each include a pair of protrusions 22a and 22c; 42a and 42c extending in a straight line in the same direction. The protrusions 22a and 22c; 42a and 42c are coupled together by a straight base portion 22b, 42b. Thus, the protrusions 22a and 22c and the protrusions 42a and 42c form the ends of the "コ"-shaped cores 22 and 42 of the tag antenna 24 and the reader/writer antenna 44, respectively.

The cores 22 and 42 of this modified example may be formed by breaking a core having a shape similar to a Japanese character "ロ". This "ロ"-shaped core may be made of the same material as used for the toroidal core. Instead of breaking such a "ロ"-shaped core, the cores 22 and 42 may be individually formed by sintering a magnetic material such that the cores have a shape similar to the Japanese character "コ".

FIG. 4 shows another modified example of the IC tag 20 of the first embodiment, in which instead of the C-shaped cores 22 and 42, cores 22 and 42 having the shape of the letter "E" as viewed from one side of the IC tag are used.

The cores 22 and 42 each include three protrusions, i.e. a protrusion 22a and protrusions 22c; a protrusion 42a and protrusions 42c which extend in a straight line in the same direction. The wires 21 and 41 are wound around the protrusions 22a and 42a of the cores 22 and 42, respectively.

Magnetic fluxes generated e.g. from the central protrusions 22a are mostly absorbed by the central protrusion 42a of the reader/writer antenna 44, which faces the protrusion 22a. Magnetic fluxes generated from the protrusions 42c at both ends of the reader/writer antenna 44 are mostly absorbed by the respective protrusions 22c of the tag antenna 24, which are located at both ends of the tag antenna 24 so as to face the respective protrusions 42c.

Figure 5:
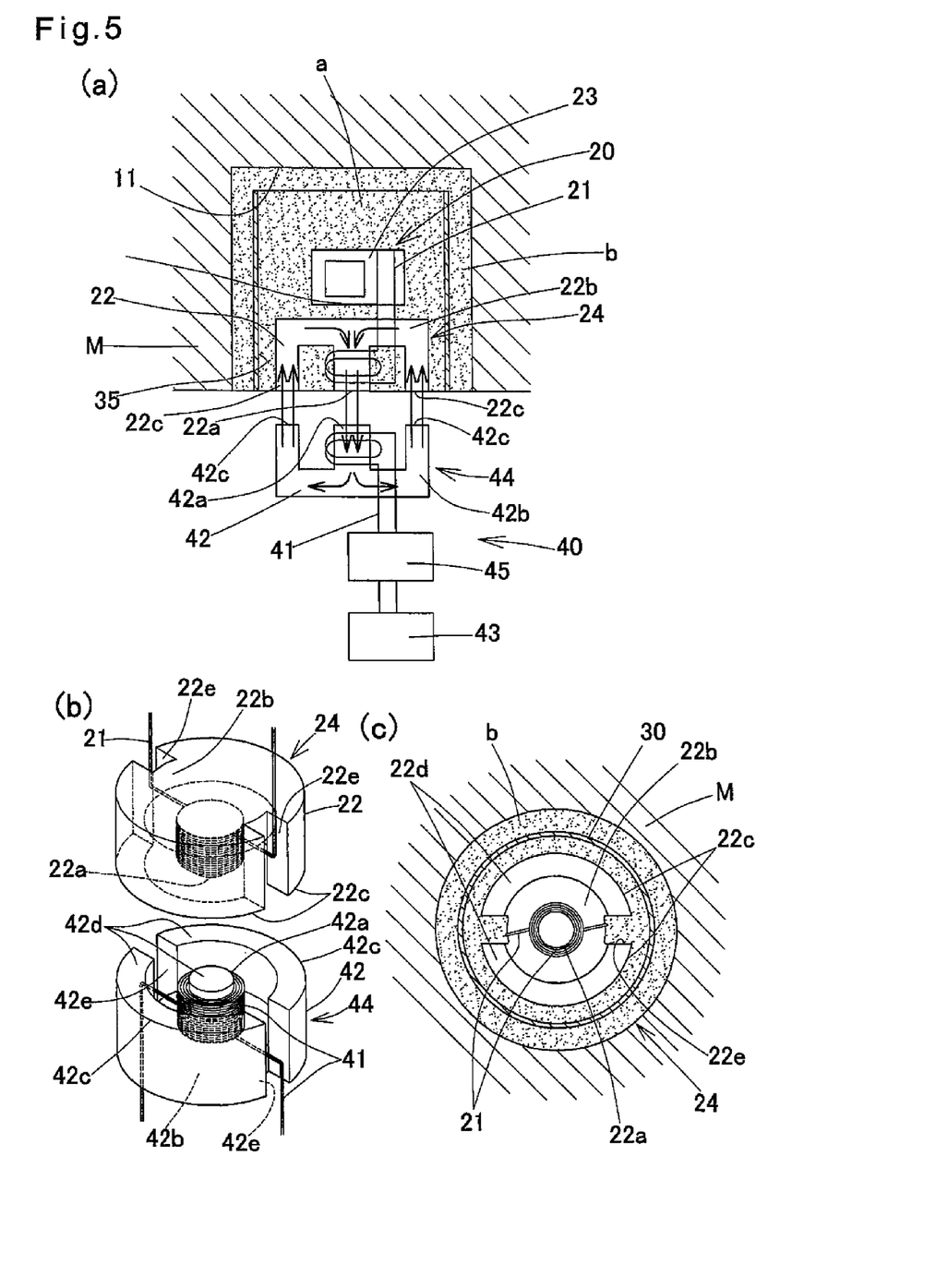
FIG. 5(a) is a partial sectional view showing the state in which the IC tag and the reader/writer device are located close to each other.
FIG. 5(b) is a perspective showing the state in which the IC tag and the reader/writer device are located close to each other.
FIG. 5(c) is a bottom plan view of the IC tag.

FIG. 5 shows another embodiment, in which the tag antenna 24 of the IC tag 20 includes a pot-shaped core 22. The pot-shaped core 22 includes a central circular columnar protrusion (first protrusion) 22a, and circular arc-shaped protrusions (second protrusions) 22c surrounding the first protrusion 22a. The second protrusions 22c are located on diametrically opposite sides of the first protrusion 22a, forming an annular peripheral wall.

The circular columnar first protrusion 22a and the circular arc-shaped protrusions 22c surrounding the protrusion 22a are coupled together by a disk-shaped base portion 22b.

The tag antenna 24 of the IC tag 20 further includes a conductor wire 21 wound around the first circular columnar protrusion 22a. An IC chip 23 is connected to both ends of the wire 21. With the wire 21 wound around the first protrusion 22a of the core 22, their end portions are extended through respective cutouts 22e defined between the circular arc-shaped second protrusions 22c to the IC chip 23.

The reader/wire antenna 44 is structurally the same as the tag antenna 24, and thus includes a pot-shaped core 42, The pot-shaped core 42 includes a central circular columnar protrusion (first protrusion) 42a, and circular arc-shaped protrusions (second protrusions) 42c surrounding the first protrusion 42a. The second protrusions 42c are located on diametrically opposite sides of the first protrusion 42a, forming an annular peripheral wall.

The circular columnar first protrusion 42a and the circular arc-shaped protrusions 42c surrounding the protrusion 42a are coupled together by a disk-shaped base portion 42b.

A wire 41 is wound around the first protrusion 42a of the core 42 and has its ends connected to a matching circuit 45 of the reader/writer 43 of the reader/writer device 40. With the wire 41 wound around the first protrusion 42a of the core 22, their end portions are extended through respective cutouts 42e defined between the circular arc-shaped second protrusions 42c to the matching circuit 45 of the reader/writer 43.

Since the antenna terminals of ordinary reader/writers have an impedance of 50Ω, the inductance of the antenna coil is adjusted to 50Ω, by the matching circuit so that the output of the reader/writer can be efficiently transmitted to the antenna, and so that the signal from the tag can be entered into the reader/writer without attenuation.

In order to stabilize magnetic fluxes, the end surfaces 22d and 42d of the central first protrusions 22a and 42a and the second protrusions 22c and 42c, which form peripheral walls, of the respective cores 22 and 42 are flat surfaces.

The flat end surfaces 22a and 22c; 42a and 42c are preferably located in a single plane. But they may not be in a common plane. In particular, provided the tag maintains sufficient sensitivity, the positional relationship between the flat surfaces as well as their orientations is not limited.

In order to exchange information between the IC tag 20 and the reader/writer device 40, with the reader/writer device 40 powered on so that the device 40 can transmit and receive signals, the tag antenna 24 and the reader/writer antenna 44 are moved close to each other until, as shown in FIG. 5(a), the first protrusion 42a and the second protrusions 42c of the reader/writer antenna 44 are aligned with the first protrusion 22a and the second protrusions 22c of the tag antenna 24, respectively.

In this state, as shown by the arrows in FIG. 5(a), magnetic fluxes leaving (and entering) the respective protrusions 22a and 22c of the tag antenna 24 mostly pass through the opening of the hole 11 of the metal member M, i.e. pass the inside of the edge of the opening of the hole 11, to outside the hole 11. Thus, the IC tag 20 and the reader/writer device 40 can form a closed magnetic circuit with high sensitivity sufficient to allow exchange of information between the IC tag 20 and the reader/writer device 40.

For example, as shown in FIG. 5(a), magnetic fluxes leaving the central first protrusion 22a of the tag antenna 24 of the IC tag 20 are mostly absorbed by the first central protrusion 42a of the reader/writer antenna 44, which faces the protrusion 22a, while magnetic fluxes leaving the second protrusions 22c of the reader/writer antenna 44 are mostly absorbed by the second protrusions 22c of the tag antenna 24, which face the respective second protrusions 42c.

Since the tag antenna 24 and the reader/writer antenna 44 are identical in shape and size, with the first protrusion 22a, 42a of each antenna surrounded by the second protrusions 22c, 42c, which form a circular wall in plan view, simply by aligning the first protrusions 22a and 42a with each other (so as to be coaxial with each other), the second protrusions 22c and 42c face each other such that information can be exchanged between the IC tag 20 and the reader/writer device 40, irrespective of the circumferential positional relation between the IC tag 20 and the reader/writer device 40.

Thus, by using the pot-shaped cores 22 and 42, the IC tag 20 and the reader/writer device 40 can be coupled together such that information can be exchanged therebetween simply by aligning the axes of the tag antenna 24 and the reader/writer antenna 44 with each other, without the need to adjust the relative angular position between the antennas. This makes it possible to easily and reliably read information from either of the IC tag 20 and the reader/writer device 40.

In the embodiment, as described above, the first protrusion 22a, 42a of either of the tag antenna 24 and the reader/writer antenna 44 is a circular columnar protrusion extending along the axis of the antenna and surrounded by the circular arc-shaped second protrusions 22c, 42c. But the first protrusions 22a and 42a may not be circular columnar protrusions but may be e.g. polygonal columnar protrusions, truncated conical protrusions, or prismoidal protrusions. The second protrusions 22c, 42c of each antenna are also not limited in shape, provided they form a continuous or discontinuous peripheral wall surrounding the first protrusion 22a, 42a. Instead of the two second protrusions 22c, 42c, a single annular second protrusion 22c, 42c that extends the entire circumference may be used. In this case, it is necessary to provide the single protrusion 22c with portions through which the ends of the wire 21, 41 extend.

The tag antenna 24 and the reader/writer antenna 44 are preferably identical in shape and size to each other. But either one of them may be larger than the other, because even in this case, the antennas can sufficiently perform their expected function.

FIG. 6(a) shows another embodiment in which the tag antenna 24 and the IC chip 23 of the IC tag 20 are received in a recess 31 formed in a casing 30 which is fixed in position in the hole 11 of the metal member M such that the recess 31 faces the opening of the hole 11.

The IC tag 20 is mounted in the recess 31 of the casing 30 such that the end surface or surfaces of the protrusion or protrusions 22a of the tag antenna 24 face the opening of the recess 31, and thus the opening of the hole 11 of the metal member M. The IC tag 20 and the reader/writer device 40 used in this embodiment may be those of any of the above-described embodiments.

The casing 30 has an external thread 32 formed on the outer periphery thereof so that when the casing 30 is driven into the hole 11 of the metal member M, the external thread 32 is brought into threaded engagement with an internal thread 32 of the hole 11, which is preferably formed on the inner wall of the hole 11 before the casing 30 is driven into the hole 11, but may be formed, i.e. "tapped" by the external thread 32 when the casing 30 is driven into the hole 11.

With this arrangement, since the casing 30 is fixed in position in the hole 11 of the metal member M by threaded engagement, the IC tag 20 can be easily mounted to and dismounted from the metal member M. This arrangement also allows reuse of the IC tag 20.

By adjusting the length (in the depth direction of the hole 11) of the portion of the casing 31 that is in threaded engagement with the hole 11, it is possible to adjust the position (depth) of the tag antenna 24 of the IC tag relative to the surface of the metal member M. This makes it easier to adjust the sensitivity of the tag. A similar external thread 32 may be formed on a casing 30 having a different shape, such as the above-described tubular casing 30.

Figure 6:
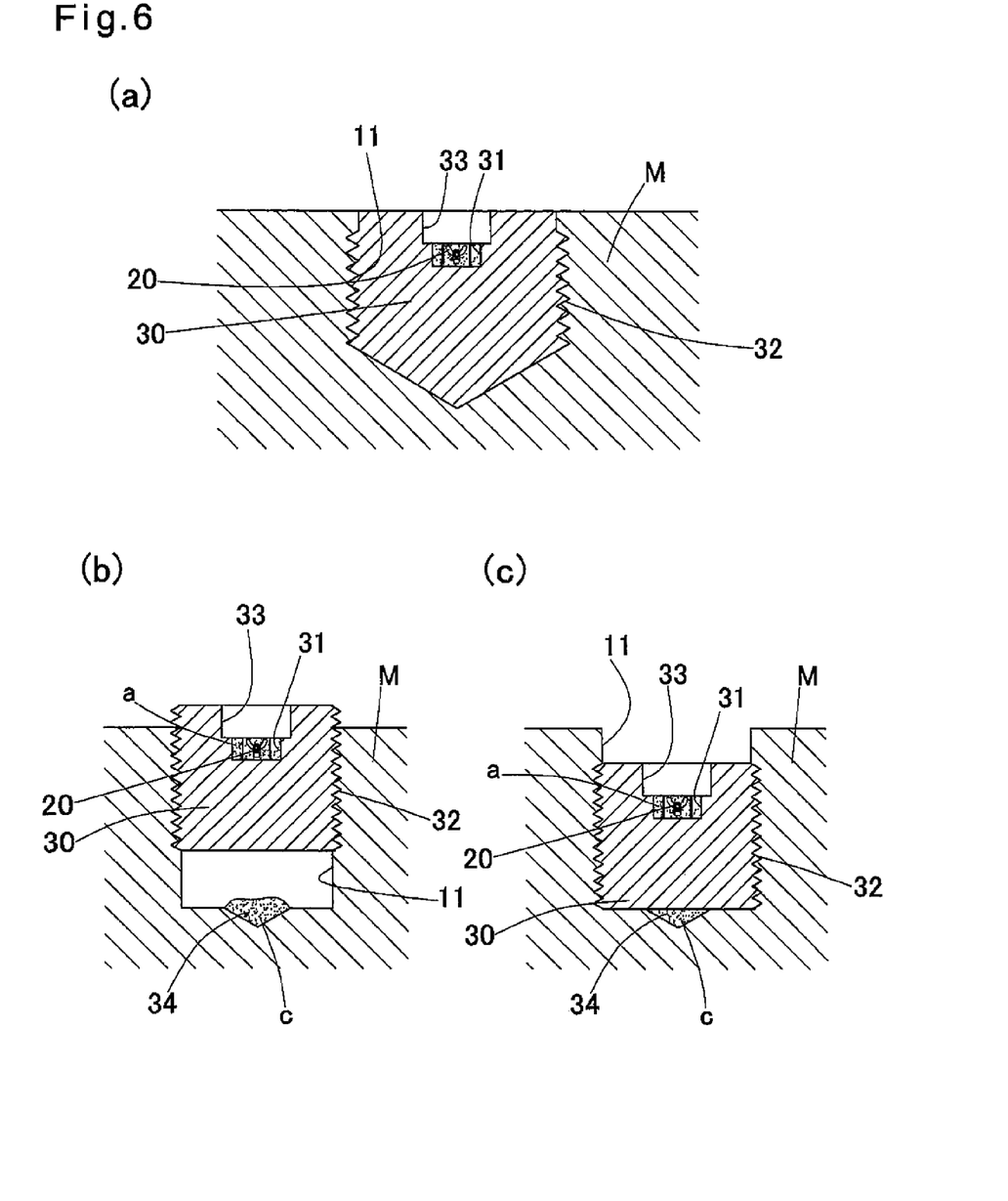
FIGS. 6(a), 6(b) and 6(c) are sectional views of different mounting structures by means of which the IC tag is mounted in the metal member.

As shown in FIG. 6, the casing 30 is preferably completely received in the hole of the metal member. The casing 30 is particularly preferably in the form of a setscrew, i.e. in the form of a hollow or solid cylindrical threaded shank with no head. With the casing completely received in the hole 11, the IC tag 20 and the casing 30 are more reliably protected against damage due to collision with foreign matter. Also, this makes it possible to process the surface of the metal member M after mounting the IC tag 20.

In the embodiment of FIG. 6(a), the hole 11 of the metal member M has a bottom in the shape of a bowl. In particular, the bottom of the hole 11 is tapered such that its diameter gradually decreases toward the deepest center. The bottom of the casing 30 is tapered so as to be complementary in shape to the bottom of the hole 11 such that the bottom of the casing 30 is brought into close surface contact with the bottom of the hole 11.

With this arrangement, when the casing 30 is driven into the hole 11 until the bottom of the casing 30 comes into close surface contact with the bottom of the hole 11, the frictional force between the surface contact surfaces prevents loosening of the casing 30.

In another arrangement, show in FIGS. 6(b) and 6(c), an adhesive holding recess 34 is formed in the bottom of the hole 11 in which an packing c is received. By using an adhesive as the packing c, the IC tag 20 and the casing 30 are bonded to the inner wall of the hole 11 with increased strength.

An adhesive may be disposed between the external thread 32 of the casing 30 and the inner wall of the hole 11 to more effectively prevent loosening of the casing 30.

The casing 30 has an operating portion 33 formed on the surface of the casing 30 that faces the opening of the hole 11. By inserting a jig in the operating portion 33, the casing 30 can be turned in the direction in which the casing 30 is driven into the hole 11, as well as in the opposite direction. The operating portion 33 may be in the form of a hole hexagonal in shape as viewed from top in which an ordinary hexagonal wrench is engageable. The operating portion 33 may be a hole of any other shape corresponding to slot screwdrivers, cross-recess screwdrivers, torque drivers, etc.

Figure 7:
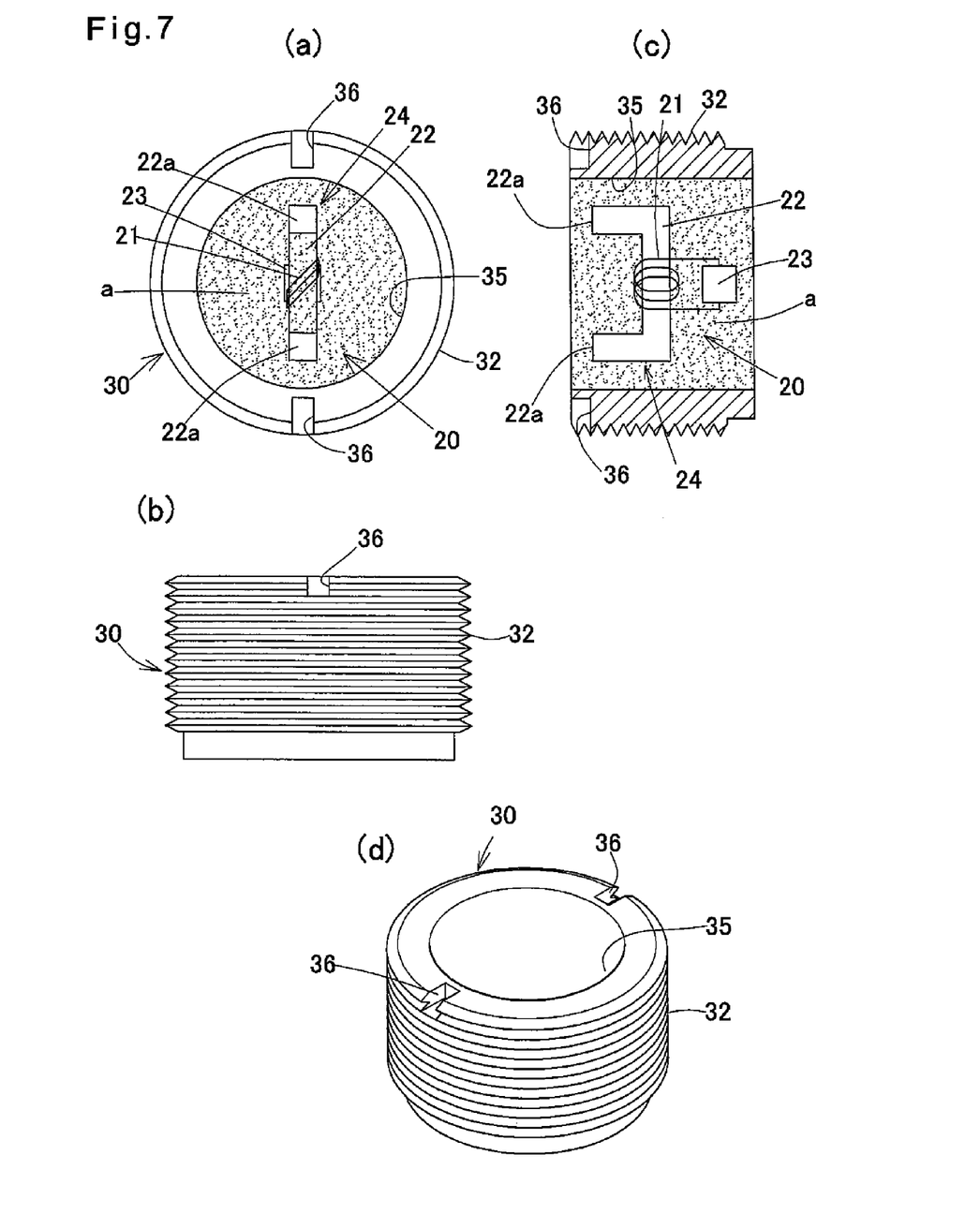
FIGS. 7(a), 7(b), 7(c) and 7(d) are a plan view, a front view, a sectional view and a perspective view, respectively, of a casing.

If, as shown in FIG. 7, a casing 30 having the shape of a hollow cylindrical setscrew is used, an operating portion 36 in the form of slots may be formed on one axial end of the casing 30.

Figure 8:
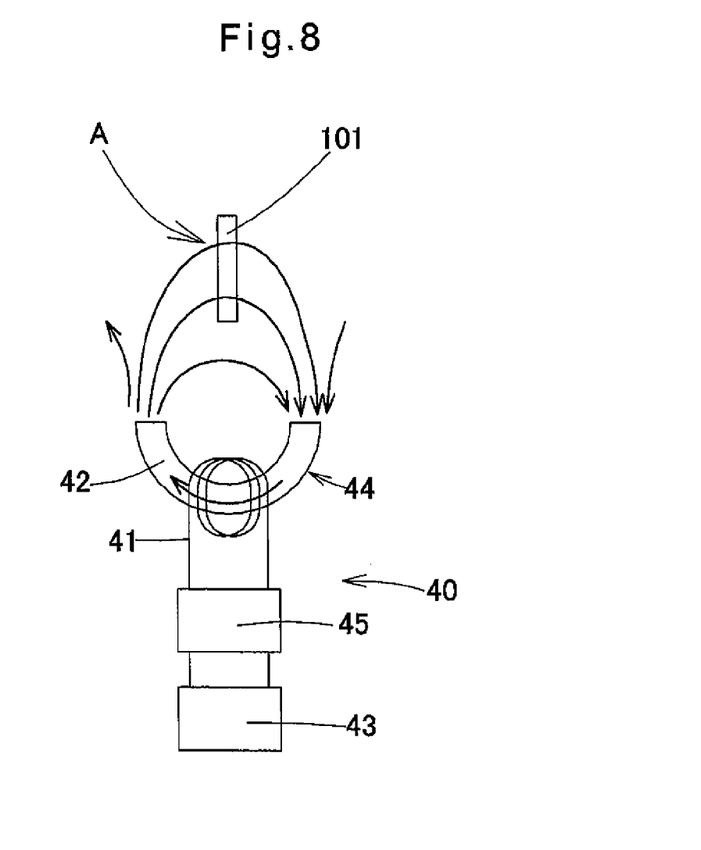
FIG. 8 schematically shows the state in which the IC tag and the reader/writer device are located close to each other.

The behavior of the reader/writer antenna 44 alone of the reader/writer device 40 is now considered. As shown in FIG. 8, magnetic fluxes leaving one of the two protrusions 42a of the core 42 of the reader/writer antenna pass through the air and enter the other protrusion 42a. It is assumed here that the lateral direction in FIG. 8 is the horizontal direction. Thus, the magnetic fluxes are horizontal at position A in FIG. 8. Thus, if an ordinary tag 101 is placed at position A in an upright position (position shown in FIG. 8), its sensitivity becomes maximum.

In this regard, in a conventional arrangement, if an ordinary IC tag 101 is placed in the horizontal position so as to face the reader/writer antenna of the reader/writer device, which is placed in the upright position as shown in FIG. 8, the communication distance becomes maximum, while if the IC tag is placed in the vertical position, its sensitivity becomes zero and no communication is possible.

By using the reader/writer antenna 44 according to the present invention in an RFID system, reading and writing with the maximum sensitivity become possible by placing the IC tag 101 in the vertical position.

In any of the above embodiments, the distance between the tag antenna 24 of the IC tag 20 and the reader/writer antenna 44 of the reader/writer device 40 is nearly zero. But sufficient communication is possible up to about 5 mm of this distance. If this distance is within the range of 0 to about 5 mm, sufficient communication is possible using an ultra-small tag having a wall thickness of about 3 mm.

DESCRIPTION OF THE NUMERALS

1. Outer race
2. Inner race
3. Rolling element
4. Retainer
10. Rolling bearing
11. Hole
20, 101. IC tag
21. Wire
22. Core
22a. Protrusion (first)
22b. Base portion
22c. Protrusion (second)
22d. End surface
22e. Cutout
23, 103. IC chip
24, 104. Tag antenna
30. Casing
31. Recess
32. External thread
33, 36. Operating portion
34. Adhesive holding recess
35. Inner wall
40, 110. Reader/writer device
41. Wire
42. Core
42a. Protrusion (first)
42b. Base portion
42c. Protrusion (second)
42d. End surface
42e. Cutout
43, 113. Reader/writer
44, 114. Reader/writer antenna
45, 115. Matching circuit
121. Countersink
121a. Bottom
121b. Opening
A. Shaft
H. Housing
M. Metal member
a, b. Packing (adhesive)
c. Adhesive

What is claimed is:

1. A bearing assembly comprising a rolling bearing (10) including an outer race (1), an inner race (2) and rolling elements (3) disposed between the outer race (1) and the inner race (2), and an IC tag (20) capable of communicating with an external reader/writer device without contacting the external reader/writer device, and attached to a metal member (M) of the rolling bearing (10), wherein the IC tag (20) includes a tag antenna (24) and is configured such that information can be exchanged between the tag antenna (24) and a reader/writer antenna of the external reader/writer device by forming a closed magnetic circuit between the tag antenna (24) and the reader/writer antenna, wherein an entirety of the IC tag (20) is received in a tubular casing (30) and an entirety of the tubular casing is received in a hole (11) formed in a surface of the metal member (M) of the rolling bearing (10), wherein the tag antenna (24) includes a plurality of protrusions (22a and 22c) facing an opening of the hole (11), wherein the protrusions (22a and 22c) are arranged such that magnetic fluxes leaving and/or entering the protrusions (22a and 22c) pass inside of an edge defining an opening of the hole (11) and extend to an outside of the hole (11), whereby the information can be exchanged between the IC tag (20) and the external reader/writer device, wherein the protrusions (22a and 22c) are portions of a core (22) made of a material having a high magnetic permeability and including a base portion (22b) through which the protrusions (22a and 22c) are coupled together, wherein the tag antenna (24) further comprises a wire (21) made of a conductive material and wound around one of the base portion (22b) and the protrusions (22a and 22c), and wherein the IC tag (20) further comprises an IC chip (23) connected to two ends of the wire (21), and wherein the entirety of the IC tag (20) that is received in the tubular casing (30) includes the tag antenna (24), the IC chip (23) and the core (22), and wherein the protrusions (22a and 22c) have end surfaces (22d) facing one of two openings of the tubular casing (30) at two respective axial ends of the tubular casing (30).

2. The bearing assembly of claim 1, wherein the IC tag (20) further comprises a packing (a) placed in a space defined between the tag antenna (24) and the IC chip (23) and an inner wall of the tubular casing (30).

3. The bearing assembly of claim 2, wherein the packing (a) is made of resin or rubber.

4. The bearing assembly of claim 1, wherein the tubular casing (30) is fixed in position in the hole (11) by an adhesive (b, c).

5. The bearing assembly of claim 1, wherein the tubular casing (30) has an external thread (32) on an outer periphery of the tubular casing (30), and wherein the tubular casing (30) is fixed in position in the hole (11) with the external thread (32) in threaded engagement with the hole (11).

6. The bearing assembly of claim 5, wherein an adhesive (c) is disposed between the external thread (32) and an inner wall of the hole (11).

7. A bearing assembly comprising a rolling bearing (10) including an outer race (1), an inner race (2) and rolling elements (3) disposed between the outer race (1) and the inner race (2), and an IC tag (20) capable of communicating with an external reader/writer device without contacting the external reader/writer device, and attached to a metal member (M) of the rolling bearing (10), wherein the IC tag (20) includes a tag antenna (24) and is configured such that information can be exchanged between the tag antenna (24) and a reader/writer antenna of the external reader/writer device by forming a closed magnetic circuit between the tag antenna (24) and the reader/writer antenna, wherein an entirety of the IC tag (20) is received in a tubular casing (30) and an entirety of the tubular casing (30) is received in a hole (11) formed in a surface of the metal member (M) of the rolling bearing (10), wherein the tag antenna (24) includes a plurality of protrusions (22a and 22c) facing an opening of the hole (11), wherein the protrusions (22a and 22c) are arranged such that magnetic fluxes leaving and/or entering the protrusions (22a and 22c) pass inside of an edge defining the opening of the hole (11) and extend to an outside of the hole (11), whereby the information can be exchanged between the IC tag (20) and the external reader/writer device, wherein the protrusions (22a and 22c) are portions of a core (22) made of a material having a high magnetic permeability and including a base portion (22b) through which the protrusions (22a and 22c) are coupled together, wherein a first one of the protrusions (22a) is surrounded by at least a second one of the protrusions (22c), wherein the tag antenna (24) further comprises a wire (21) made of a conductive material and wound around the first one of the protrusions (22a), and wherein the IC tag (20) further comprises an IC chip (23) connected to two ends of the wire (21), and wherein the entirety of the IC tag (20) that is received in the tubular casing (30) includes the tag antenna (24), the IC chip (23) and the core (22), and wherein the protrusions (22a and 22c) have end surfaces (22d) facing one of two openings of the tubular casing (30) at two respective axial ends of the tubular casing (30).

8. The bearing assembly of claim 7, wherein the tubular casing (30) is fixed in position in the hole (11) by an adhesive (b, c).

* * * * *